United States Patent
Gengerke

(10) Patent No.: US 11,618,633 B2
(45) Date of Patent: Apr. 4, 2023

(54) GRAIN BIN CLUMP REMOVER

(71) Applicant: S7 IP Holdings, LLC, Groton, SD (US)

(72) Inventor: Shawn L. Gengerke, Groton, SD (US)

(73) Assignee: S7 IP Holdings, LLC

( * ) Notice: Subject to any disclaimer, the term of this patent is extended or adjusted under 35 U.S.C. 154(b) by 114 days.

(21) Appl. No.: 17/391,698

(22) Filed: Aug. 2, 2021

(65) Prior Publication Data
US 2021/0354931 A1  Nov. 18, 2021

Related U.S. Application Data

(63) Continuation-in-part of application No. PCT/US2020/026299, filed on Apr. 2, 2020.

(51) Int. Cl.
| | | |
|---|---|---|
| *B65G 33/38* | (2006.01) | |
| *B65D 88/68* | (2006.01) | |
| *B65G 69/14* | (2006.01) | |

(52) U.S. Cl.
CPC ............. *B65G 33/38* (2013.01); *B65D 88/68* (2013.01); *B65G 69/14* (2013.01)

(58) Field of Classification Search
CPC ........ B65G 33/32; B65G 33/10; B65G 33/34; B65G 33/38; B65G 65/466; B65G 65/46; B65G 69/08; B65G 69/14; B65D 88/546; B65D 88/68; B65D 88/64; A01F 25/2018; A01D 41/1217

See application file for complete search history.

(56) References Cited

U.S. PATENT DOCUMENTS

| | | | |
|---|---|---|---|
| 2,914,198 A | 11/1959 | Hein | |
| 3,501,029 A * | 3/1970 | Smoker | A01F 25/2018 |
| | | | 414/311 |
| 4,103,788 A | 8/1978 | Sutton | |
| 4,183,706 A | 1/1980 | Jackson | |
| 4,875,820 A | 10/1989 | Lepp et al. | |
| 8,920,100 B1 | 12/2014 | Stahl et al. | |
| 9,855,561 B1 * | 1/2018 | Stahl | B65G 65/466 |
| 9,950,872 B2 | 4/2018 | Rauser et al. | |
| 2004/0208732 A1 | 10/2004 | Kulbeth | |
| 2008/0131242 A1 | 6/2008 | Duffy et al. | |
| 2017/0152110 A1 * | 6/2017 | Rauser | B65G 33/10 |
| 2018/0244478 A1 | 8/2018 | Rauser et al. | |

OTHER PUBLICATIONS

Korean Intellectual Property Office, International Search Report dated Dec. 30, 2020, from International Application No. PCT/US2020/026299, 3 pages.

* cited by examiner

*Primary Examiner* — Glenn F Myers
(74) *Attorney, Agent, or Firm* — Bradley J. Thorson; DeWitt LLP

(57) ABSTRACT

An apparatus and method for breaking up clumps of grain encountered during the emptying of a grain bin includes a beater assembly having a shaft with a plurality of knives extending radially therefrom. The beater assembly is adapted to be attached to or unattached from an end of a sweep auger. The beater assembly is positioned to overlay a gated opening in the floor of the grain bin through which grain flows during unloading thereof. The same motor used to drive the bin's discharge auger located below the bins floor also is made to drive the beater assembly located above the floor by linking the shaft of the discharge auger through a pair of right angle gear boxes to the shaft of the beater assembly.

14 Claims, 6 Drawing Sheets

GRAIN BIN CLUMP REMOVER

CROSS-REFERENCED TO RELATED APPLICATIONS

This application claims priority to and is a continuation-in-part of International application No. PCT/US2020/026299 filed Apr. 2, 2020.

STATEMENT REGARDING FEDERALLY SPONSORED RESEARCH OR DEVELOPMENT

Not applicable

BACKGROUND OF THE INVENTION

I. Field of the Invention

The present invention relates to agricultural grain storage bins and more particularly to an improved method and apparatus for safely removing grain from such storage bins.

II. Discussion of the Prior Art

Conventional grain storage bins generally comprise a concrete base upon which a cylindrical, corrugated-steel wall is situated and atop the cylindrical wall is a conical top having a closable opening through which grain to be stored may be entered, usually by way of an auger conveyor capable of moving grain to be stored from ground level to the top of the bin. Such bins are sold in varying sizes and may range in diameter from around 15 feet to as much as 150 feet and of a height dimension from about 20 feet to 200 feet. Such grain bins will typically have a false floor disposed a few feet above the concrete foundation slab and the false floor will have at least one gated opening therein leading to a sump formed in the foundation slab. Disposed beneath the false floor is an electric motor driven auger based unloading conveyor leading from the sump to the exterior of the bin. When the gate for the opening in the floor is opened, the grain will flow into the sump by gravity and will be carried out by the unloading conveyor to another exterior conveyor for loading the grain into a truck for transport.

Existing systems further incorporate a so-called "sweep auger" on the false floor for moving grain remaining after the gravity flow ceases from the floor to the gated opening. The sweep auger is adapted to be mechanically coupled via gear boxes to the unloading conveyor disposed beneath the false floor and is therefor driven by the same electric motor used to drive the unloading conveyor.

It is often found that due to moisture in the grain and some rotting that may take place during prolonged storage, as well as ice formation in colder climates, that the grain can become clumped and when the clumps reach the opening in the false floor, they are too large to pass through and therefore occlude the opening. This can create a serious safety hazard should a worker enter the bin and attempt to clear the blocked opening. There have been many instances where the grain sloping down from the bin walls to the gated opening will suddenly form an avalanche to bury and smother a worker as an attempt is being made to dislodge clumps from the gated opening in the false floor.

U.S. Patent Publication 2018/0244478 A1 of Rauser et al dated Aug. 30, 2018 describes a bin sweep auger unplugging system that comprises a plurality of round sticks (i.e., cylindrical rods that are round in cross section extending from a drive shaft. The drive shaft is connected to a driven shaft 62 of an auger by a clutch. At least six problems exist with the Rauser et al system.

First, the round sticks often only serve to push clumps about the drive shaft rather than causing the clumps to disintegrate. Second, to start the auger and an attached beater under full bin capacities of over 15,000 bushels, it is critical to keep start up thrust (torque) as low as possible. The round sticks used in the Rauser et al system cause so much startup torque that the entire Rauser et al system is prone to failure to start under compaction load, thus defeating the system and making it useless. Third, the clutch can slip causing the drive shaft and the driven shaft not to operate in tandem. Fourth, there is no way to clear or break-up any chunks that get under the drive shaft and the free ends of the sticks. Often these chunks will bridge the openings of the gate preventing grain from passing through the gate. Fifth, the intended function of the auger is to pull grain through the gate into the center sump. The drive shaft of the Rauser et al system to which the sticks are attached fails to efficiently move the grain in this required fashion. Sixth, the Rauser et al system must be installed at the time of the original construction of the grain bin. There is no practical way to retrofit existing installations of the Rauser et al system without replacing the complete power sweep system which involves ripping ups the bin floor. Through investigation, I have found that with one exception all power sweep gear boxes on the market have to turn in the same direction so that the flighting of the sweep auger will pull the grain to the center sump area. The device of the present invention operates in the same rotation direction. The exception is the sweep of the Rauser '478 published application which requires a reversible gear box that runs backwards along with its slip clutch that slips in the normal direction.

The present invention overcomes these and other problems of the Rauser et al system.

SUMMARY OF THE INVENTION

There is provided a method of breaking up clumps of compacted grain reaching a discharge opening in the floor of a grain storage bin during gravity flow of grain through the discharge opening. To achieve this end. A beater member having a shaft of a length sufficient to span a length dimension of the discharge opening is placed in close, but non-contact relation over the floor opening. Affixed to the beater shaft is a plurality of knife assemblies. Each knife assembly comprises a steel collar and a pair of steel knives projecting radially in opposite directions from the collar. Each knife has a body portion, a leading edge, and a tapered portion extending from the leading edge to the body portion. The collar has a center opening adapted to receive the beater shaft. The knife assemblies are affixed along the length of the shaft of the beater member about two inches apart with the knives of the immediately adjacent knife assemblies angularly offset rather than aligned with each other. Each knife assembly can be affixed to the shaft at the desired position along the shaft, and at the desired angular offset from the adjacent knife assemblies using any conventional means.

The beater member is journaled for rotation in bearing blocks affixed to the frame of the sweep conveyor. A circular flange member is affixed to a first end of the beater member's shaft. The second end of the beater member's shaft is mechanically coupled to a rotational drive source for only driving the beater member during gravity flow of loose grain with clumps of compacted grain to and through the discharge opening where the knives on the beater member shaft are effective to reduce the size of any clumps reaching the discharge opening. Once the flow due to gravity ceases as the level of the grain in the bin is reduced and it is therefore safe to enter the bin, a worker bolts the flange on the end of the beater assembly to a similar flange formed on an end of the shaft of the sweep auger. As such, both the beater member and the sweep auger will be driven for moving grain remaining on the floor of the grain bin into the gated opening.

The drive source for rotating the beater member includes a motor coupled in driving relation to a first end of a shaft of an unloading auger disposed beneath the floor of the grain storage bin and where a second end of the unloading auger's shaft connects to an input shaft of a first right angle gear box. A second right angle gear box has its input shaft coupled to the output shaft of the first right angle gear box and has its output shaft coupled to the shaft of the beater member. With this arrangement, the unloading auger, the beater member and the sweep auger are simultaneously driven to move the grain remaining on the bin floor when gravity is no longer able to cause the grain to feed into the gated opening and the combination functions to empty the remaining grain from the bin.

The arrangement of the knife assemblies of the beater member offers important advantages. First, the leading edge of each knife is adapted to slice through any clumps encountered and the tapered section serves to further separate and break apart the clumps. The design of the knives also eliminates much of the start-up torque minimizing torque and required thrust. Further the interaction of the leading edge, and tapered section of each knife serves to pull grain toward the sump without having to include additional flighting to do so.

Further, there is no clutch to slip, the auger and the beater member each rotate together when connected as described above, and the beater member may be easily installed without having to dismantle the entire sweep system or tear up the bin floor. Also, a gate cutter is provided so that there is virtually no risk that the gate will ever be blocked by any clumps that manage to get past the knives.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
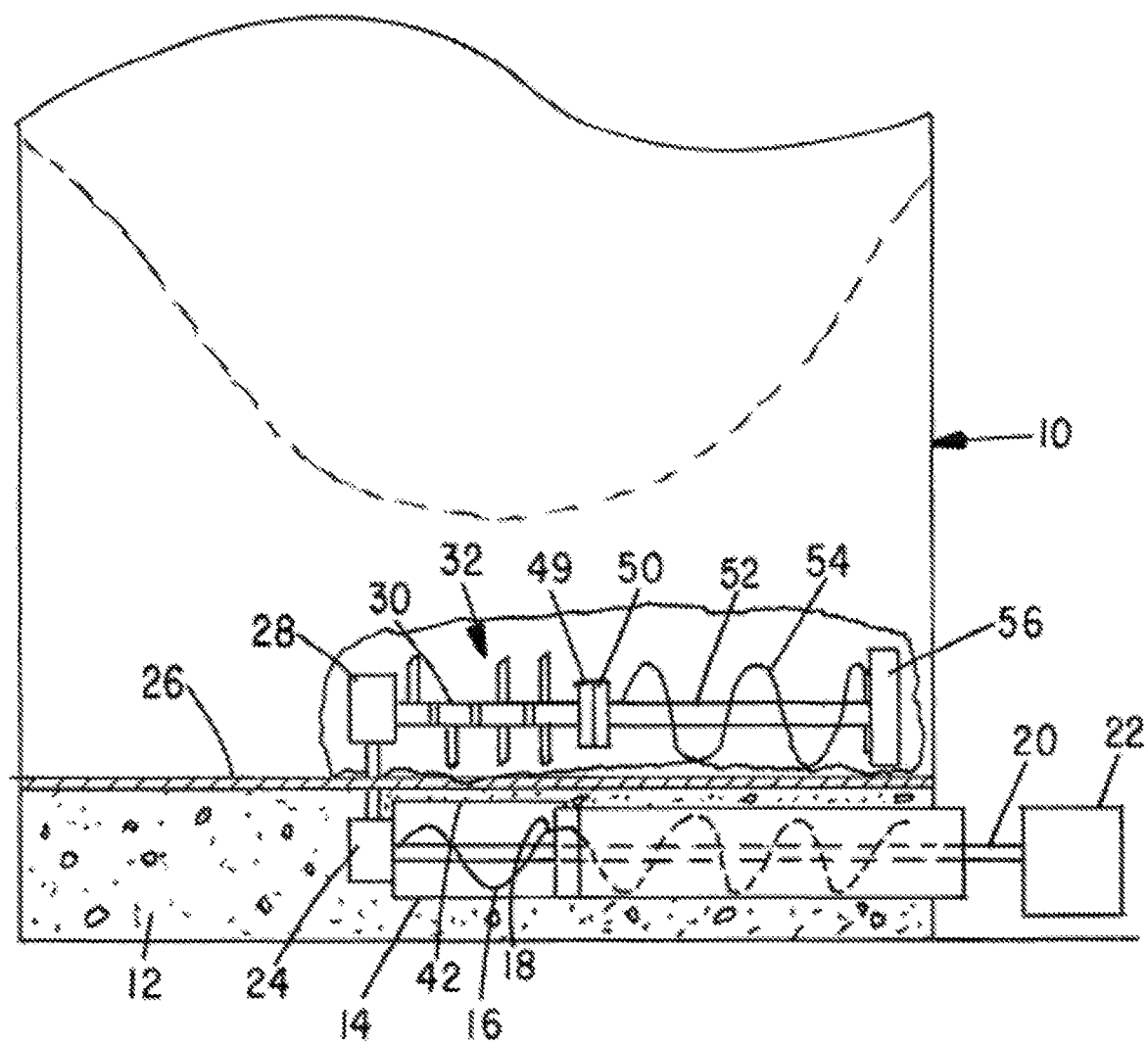
FIG. 1 is a schematic drawing of a grain bin incorporating the present invention.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring first to FIG. 1, there is illustrated a partial view of a grain bin 10 mounted on top of a concrete slab 12 that includes a tunnel 14 in which is placed a discharge auger 16 of a conventional design wherein auger flights 18 are affixed to a drive shaft 20 that is adapted to be driven by a suitable electric motor 22. The end of the shaft 20 opposite from the motor 22 is coupled to a first right angle gear box 24 whose output shaft extends through an opening in a false floor 26 of the bin 10 and connects to an input shaft of a second right angle gear box 28 whose output shaft is coupled in driving relation to a shaft 30 of a beater assembly, indicated generally by numeral 32. The opposite end of the shaft 30 is journaled for rotation in a bearing block bracket 34 connected to the orbiting arm 36 of the bin's sweep auger assembly indicated generally by numeral 38.

Figure 2:
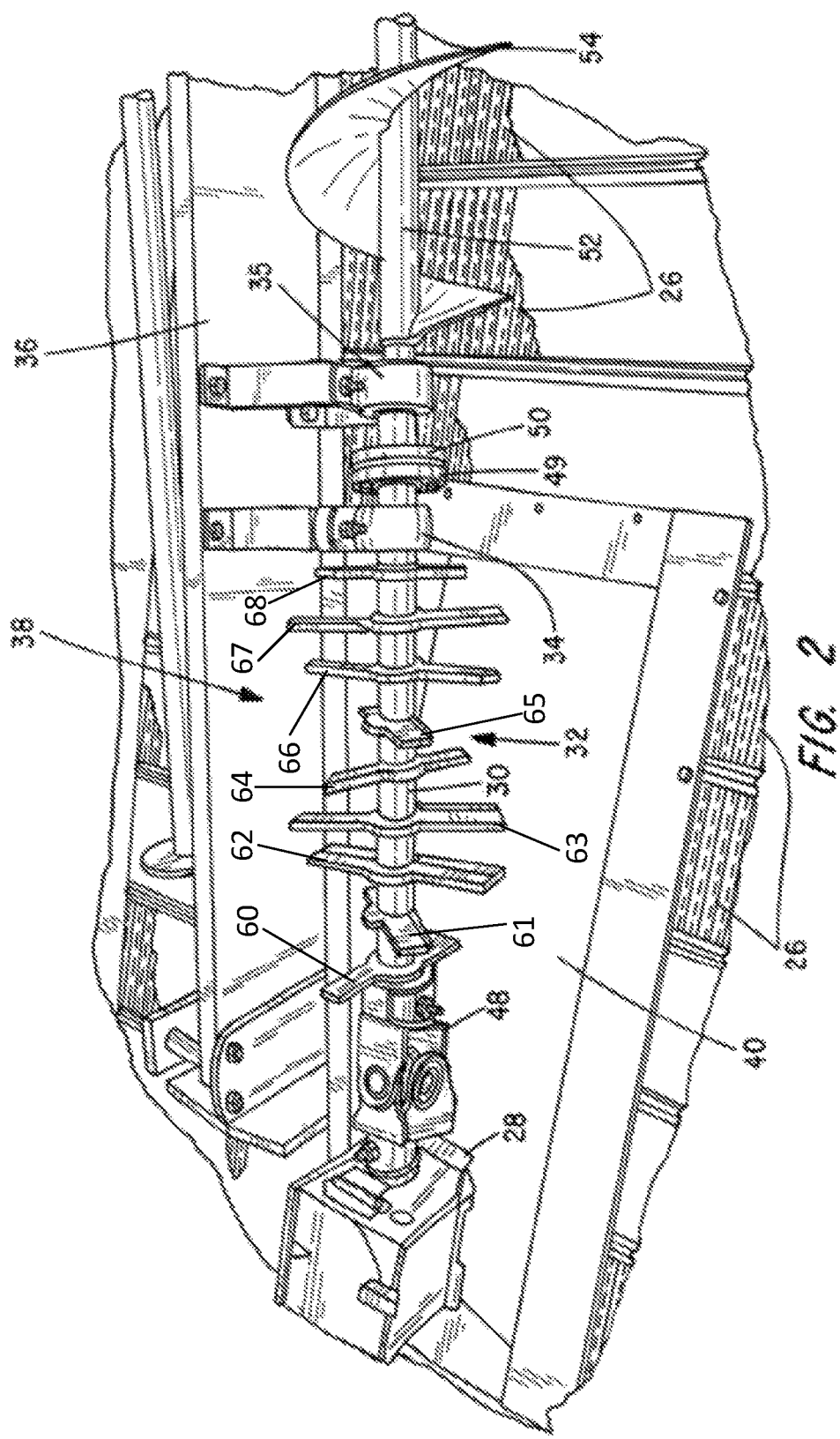
FIG. 2 is a partial view of the false floor of the grain bin showing the beater assembly of the present invention mounted to the sweep auger and overlaying the gated opening in the bin's false floor.

As shown in FIG. 2, the beater assembly 32 overlays a rectangular opening 40 formed through the false floor 26 of the bin. A gate comprising a flat metal sheet 42 (FIG. 3) is mounted in a pair of longitudinal guides (not shown) disposed on the underside of the false floor 26. A rack and pinion or other suitable mechanism controlled by an operator from a location external to the bin is used for opening and closing the gate 42 relative to the rectangular opening 40 formed through the false floor 26 of the bin, as is well known in the prior art.

Affixed to the upper surface of the slide plate 42 is a blade assembly 44 having a flat base 43 to which a plurality of triangularly shaped blades with serrated side edges 46 are attached by welding.

Figure 3:
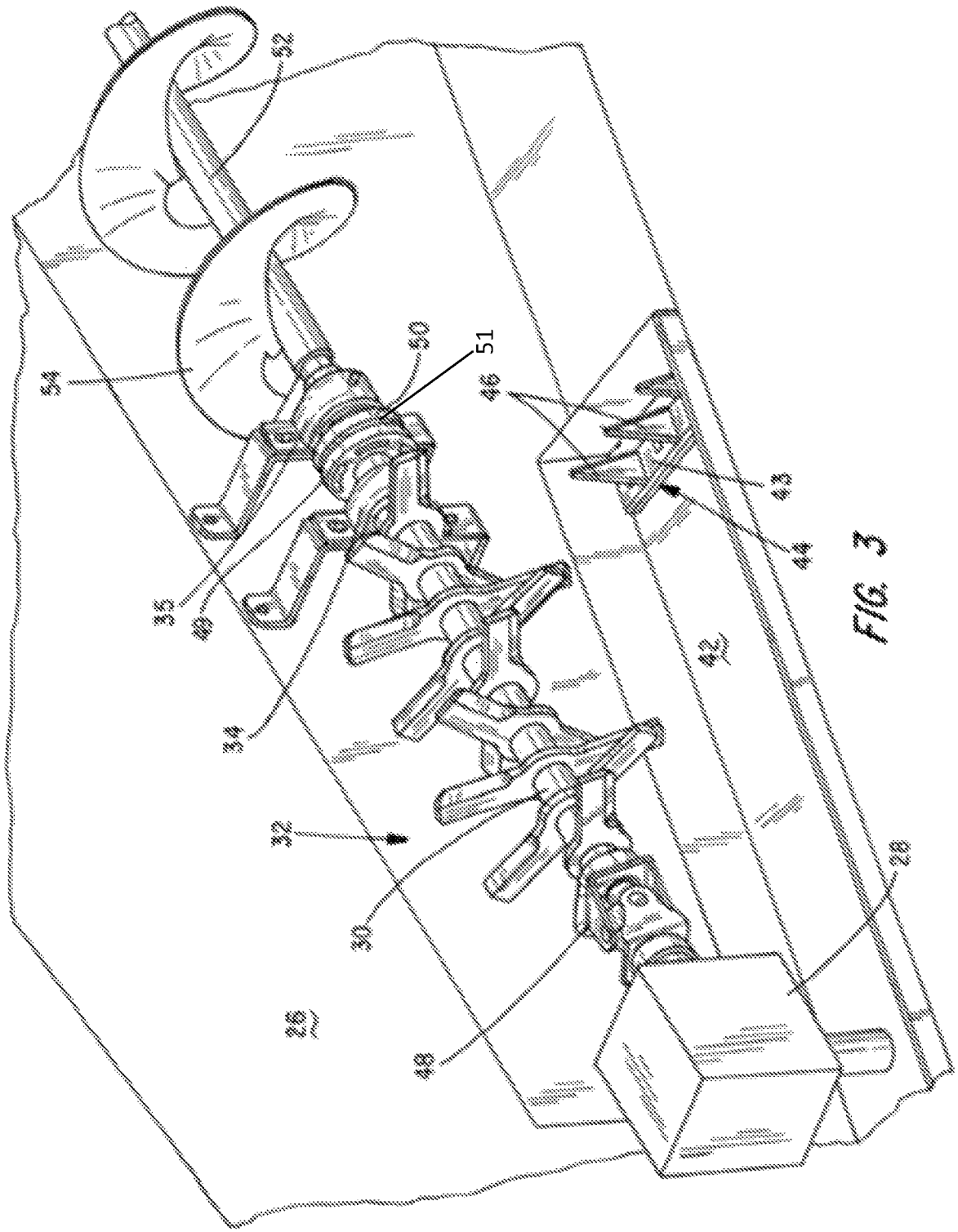
FIG. 3 is a partial, closeup view of the beater member inserted between the sweep auger's shaft and a right angle gear box.
Figure 4:
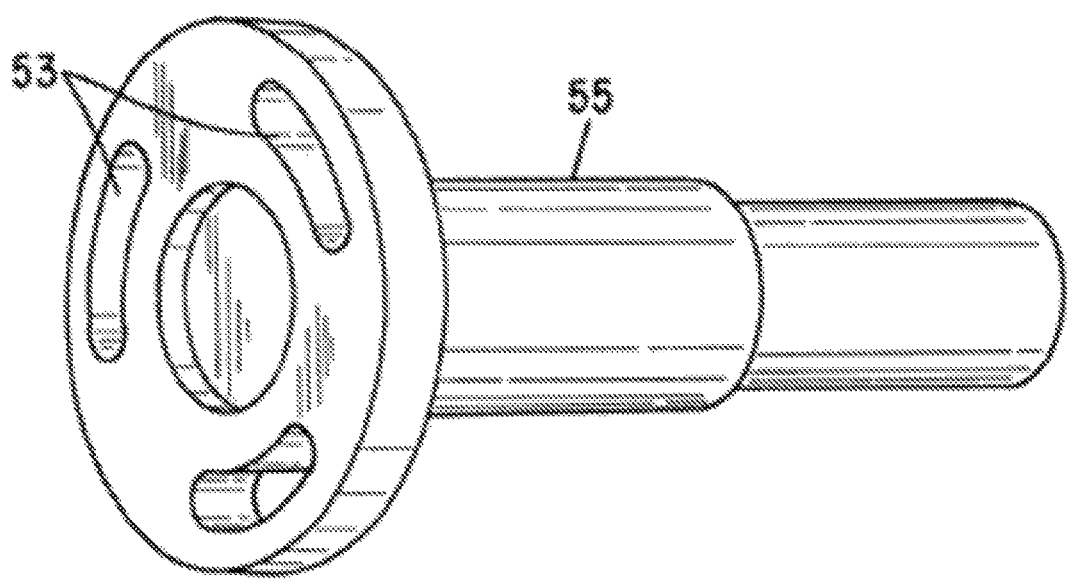
FIG. 4 is a perspective view of the flanges used to selectively couple the beater shaft to the shaft of the sweep auger.

Also seen in FIG. 3 is a universal joint 48 that is used to couple the output shaft of the gear box 28 to the shaft 30 of the beater assembly 32 to accommodate any minor misalignment of the gear box output shaft and the beater shaft. The opposite end of the shaft 30 has a cylindrical flange 48 affixed to it that is adapted to be selectively joined through a spacer disk 51 to a mating flange 50 that is fixedly attached to the inner end of the sweep auger shaft 52 having flighting 54. The outer end of sweep auger shaft 52 is coupled and journaled for rotation with respect to auger bearing 56. FIG. 4 illustrates the construction of the pair of flanges 48,50 showing the apertures 53 and the posts 55 that are dimensioned to form an interference fit in bores (not shown) formed in the ends of the beater shaft 30 and the sweep auger shaft 52. The sweep auger's shaft 52 is journaled at its inner end by bearing bracket 35 and at its outer end by auger bearing 56.

Coupled to the shaft 30 and spaced along its length are a plurality of knife assemblies 60-68. See FIG. 2. The spacing between the knife assembles can be adjusted, but a spacing of about two inches between the knife assemblies functions well. Each knife assembly 60-68 is constructed in an identical fashion. Knife assembly 60 is shown in FIGS. 5 and 6.

Figure 5:
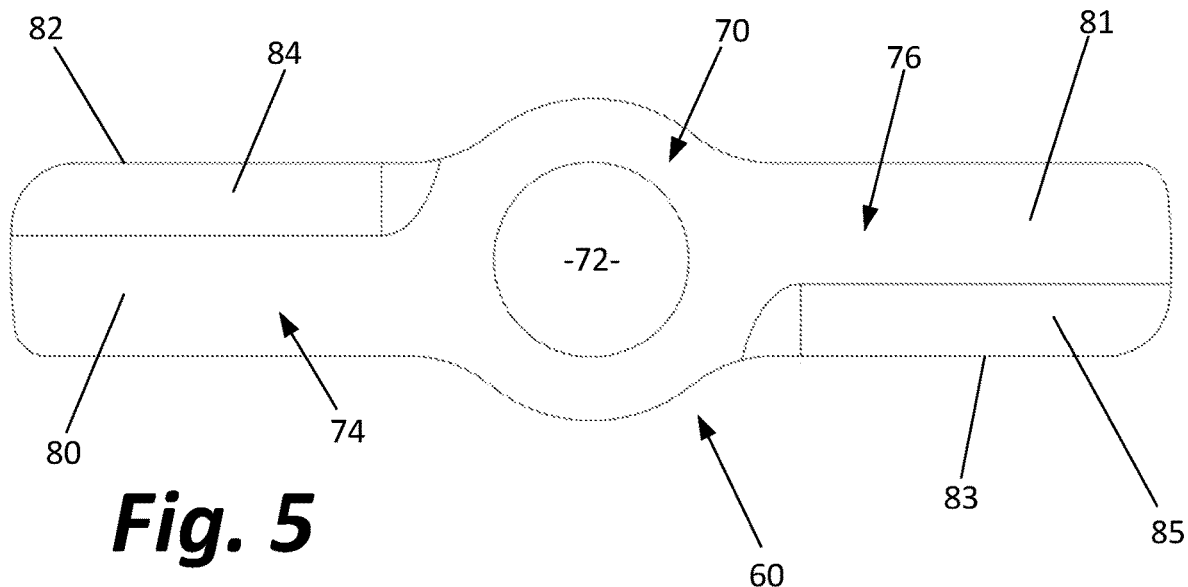
FIG. 5 is a top plan view of one of the knife assemblies of the present invention, the other knife assemblies being of the same design.
Figure 6:
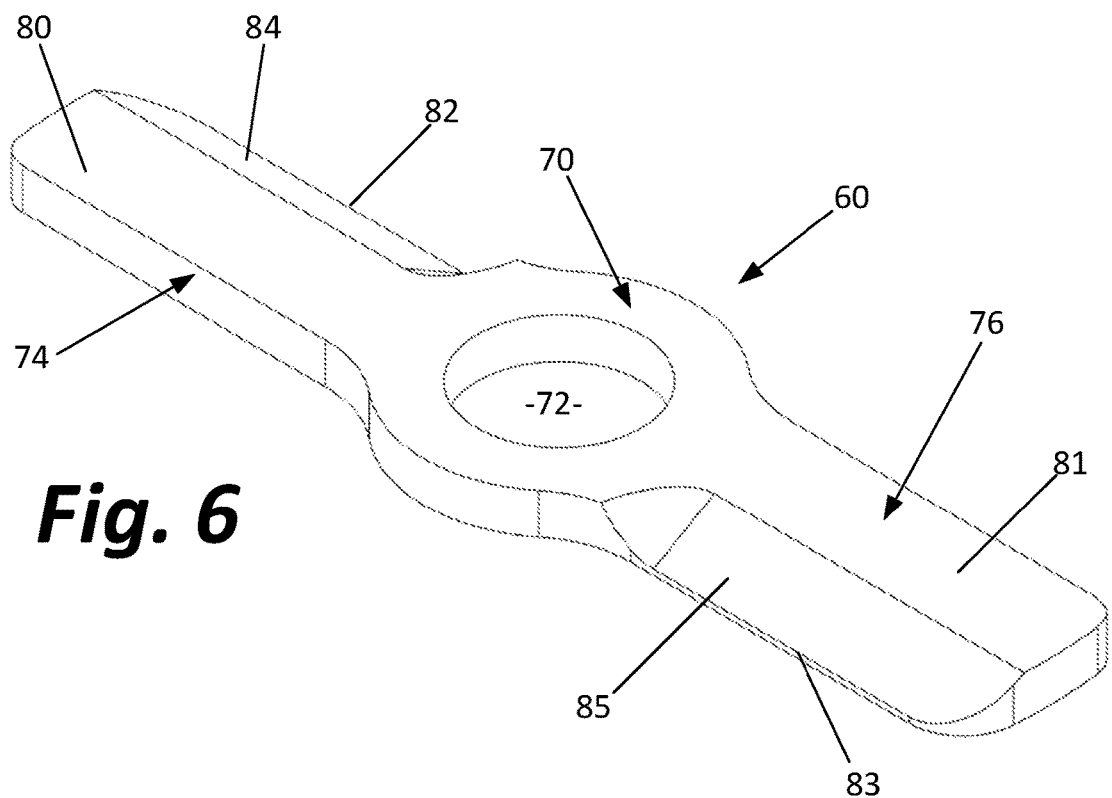
FIG. 6 is a perspective view of the knife assembly of FIG. 5.
Figure 7:
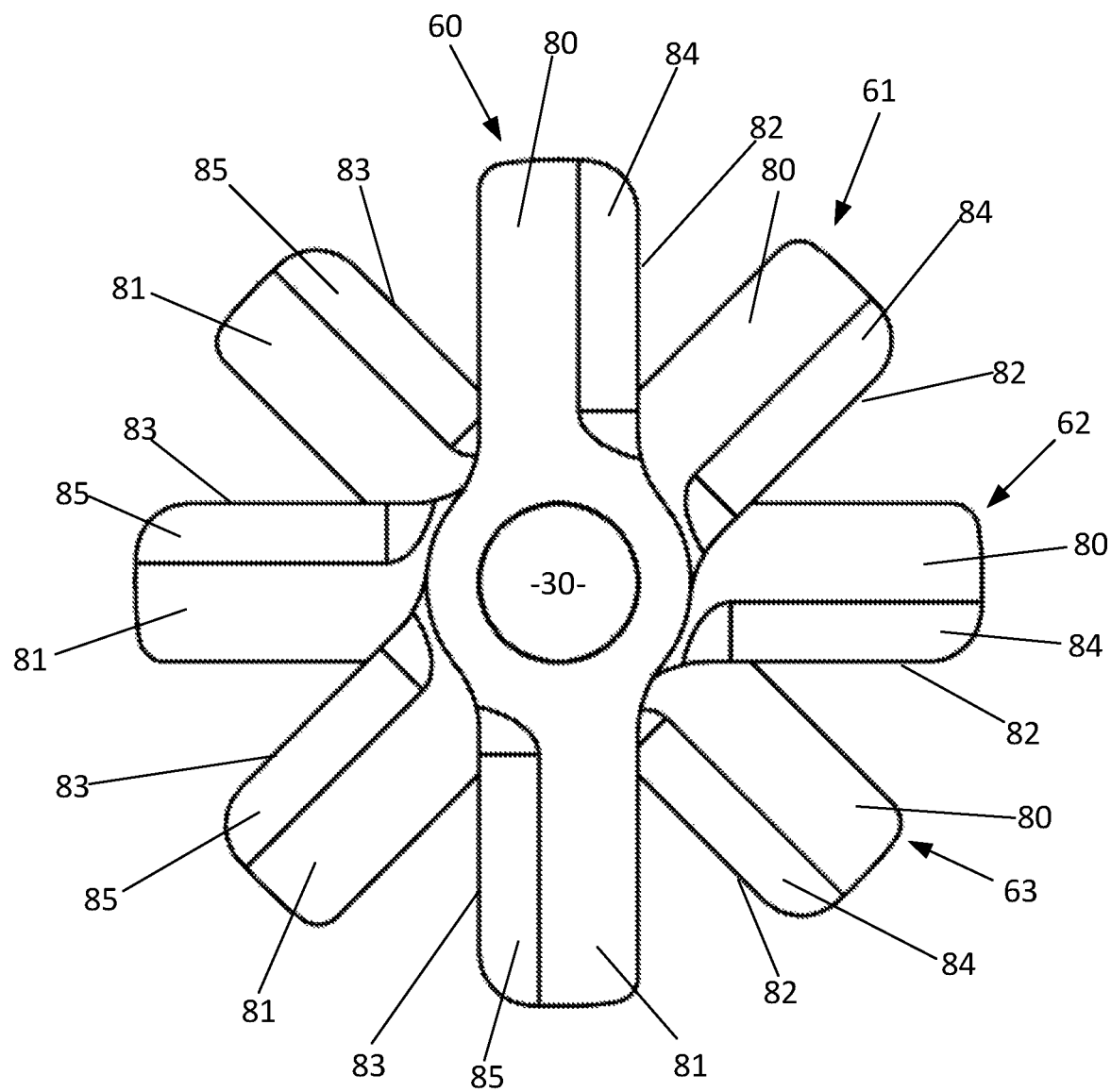
FIG. 7 is a plan view illustrating how the knife assemblies are mounted in an offset configuration to the beater shaft.

As shown in FIGS. 5 and 6, knife assembly 60 comprises a steel collar 70 and a pair of steel knives 74 and 76 projecting radially in opposite directions from the collar 70. Knife 74 has a body portion 80, a leading edge 82, and a tapered portion 84 extending from the leading edge 82 to the body portion 80. Likewise, knife 76 has a body portion 81, a leading edge 83 and a tapered portion 85 extending from the leading edge 83 to the body portion 81. The collar 70 has a center opening 72 adapted to receive the beater shaft 30. The leading edges 82 and 83 may be serrated.

The knife assemblies 60-68 are affixed along the length of the beater shaft 30 of the beater assembly 32 about two inches apart with the knives 74/76 of the immediately adjacent knife assemblies offset rather than aligned with each other. See FIG. 6. Each knife assembly 60-68 can be affixed to the shaft 30 at the desired position along the shaft 30, and at the desired offset relative to the adjacent knife assemblies, using any conventional means. Such conventional means may include, without limitation, (a) threaded bolt extending through the collar 70 and the beater shaft 30 and held in place by nut, (b) an unthreaded bolt extending through the collar 70 and the beater shaft 30 and held in place by a cotter pin, or (c) by welding the collars to the shaft. Also, the shaft 30 may include threaded bolt holes adapted to receive threaded bolts that extend through the collars 70 of the knife assemblies 60-68.

When it is desired to unload grain from a filled or partially filled bin, the motor 22 will be turned on to rotate the shaft 20 of the unloading auger 16. At this time, there is no connection between the flanges 49 and 50 and the spacer 51 is removed leaving a gap between the faces of the flanges. As such, there is no heat generated by rubbing friction between the two flanges that might be a fire hazard. The motor 22 is of a sufficient horsepower to rotate the beater assembly even when the bin is filled to capacity and the load is compacted. The rotation of the shaft 20 is coupled through the pair of right angle gear boxes 24 and 28 to drive the beater assembly 30. At this time, the sweep auger shaft 52 remains stationary. As gravity causes grain to flow through the now-open gate into the sump 14, the discharge auger 16 will move the grain from the sump to a location exterior of the bin where typically another elevator auger (not shown) will move the grain exiting the bin into an awaiting grain truck for transport.

Should a large clump of congealed grain flow downward, it will be engaged by the rotating beater assembly. The knife assemblies 60-68 thereon will flail the clump and break it up so that the pieces thereof are able to flow through the open gate into the sump where they will be extracted by the discharge auger 16. More specifically, when the shaft 30 of the beater assembly is rotated in the clockwise direction (i.e., from the perspective shown in FIG. 6) the leading edges 82/83 of the knife assemblies will first engage and cut into the clump. As the shaft 30 continues to rotate, the clump is further broken apart as the tapered sections 84/85 advance through the clump.

Once the level of the grain in the bin has reached the point where gravity flow thereof ceases, the grain in the bin will be at a level where it is safe for a person to enter the bin and insert spacer 51 between the flanges and bolts through aligned apertures in the spacer 51 and flanges 49 and 50 (e.g., apertures 53) so that the sweep auger shaft will be driven along with the beater shaft 30. Thus, as the sweep auger is made to orbit about a central axis of the bin, grain remaining on the floor of the bin will be moved to the gated opening and deposited within the sump 14 where it too is extracted by the discharge auger assembly 16 (FIG. 1).

In that it may happen that clumped grain can build up in a zone that is not reached by the beater knife assemblies 60-68, these clumps can be reduced by repeatedly opening and closing the gate plate 42 relative to the opening and thereby move the blades 46 through such clumped material to thereby break it up, allowing it to fall into the sump for extraction.

Those skilled in the art can appreciate that the beater assembly 32, along with the universal joint 48, the flanges 49 and 50, spacer disk 51 and the bearing brackets 34 and 35, along with the blade assembly, can be sold as a kit. With minimal effort, it can be installed in existing unloading and sweep systems merely by cutting the shaft 52 of an existing sweep auger, disconnecting the cut portion from the output shaft of the right angle gear box 28 and then inserting the universal joint 48 onto the shaft of the gear box. Next, by supporting the free ends of the beater shaft 30 and the remaining portion of the sweep auger shaft 52 by the bearing brackets 34 and 35, both the beater assembly and the sweep auger are able to be rotated when the flanges 49 and 50 are bolted to one another.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself. For example, the knives on the beater assembly may be formed so as to act to advance the grain to the gated opening in the bin's false floor similar to an auger flight.

What is claimed is:

1. A clump reducer for use with a train storage bin comprising:
   (a) a beater member shaft of a length corresponding to the size of a gated discharge opening formed through a floor surface of the storage bin;
   (b) a plurality of knife assemblies affixed to the beater member shaft, each of said knife assemblies comprising a collar surrounding the beater member shaft and knives projecting radially from the collar, each of the knives comprising a leading edge and a tapered portion;
   (c) means for journaling the beater member shaft for rotation in overlaying relation with respect to the gated discharge opening;
   (d) means for rotating the beater member shaft;
   (e) means for detachably joining the beater member shaft in driving relation to a shaft of a sweep auger; and
   (f) a blade assembly attached to a movable gate member wherein blades on the blade assembly project upward into the gated discharge opening.

2. The clump reducer of claim 1 wherein the leading edges of the knives of the knife assemblies are serrated.

3. The clump reducer of claim 1 wherein the blades include serrated, angled, and sharpened cutting edges.

4. The clump reducer of claim 1 wherein each knife assembly of the plurality of knife assemblies are arranged along the beater member shaft in spaced apart relation to each of the other knife assemblies of the plurality of knife assemblies.

5. The clump reducer of claim 1 wherein each knife assembly of the plurality of knife assemblies is angularly offset from those other knife assemblies of the plurality of knife assemblies to which it is immediately adjacent.

6. A clump reducer kit for use with a train storage bin comprising:
   a. a beater member shaft of a length corresponding to the size of a gated discharge opening formed through a floor surface of the storage bin;
   b. a plurality of knife assemblies adapted to be affixed to the beater member shaft in a spaced apart and angularly offset configuration, each of said knife assemblies comprising a collar surrounding the beater member shaft and knives projecting radially from the collar, each of the knives comprising a leading edge and a tapered portion;
   c. a blade assembly adapted to be attached to a movable gate member; and
   d. means for detachably joining the beater member shaft in driving relation to a shaft of a sweep auger,
   wherein blades on the blade assembly are adapted to project upward into the gated discharge opening, and wherein the beater member shaft is adapted to be operatively coupled to means for journaling the beater member shaft for rotation in overlaying relation with respect to the gated discharge opening, and means for rotating the beater member shaft.

7. The clump reducer kit of claim 6 wherein the leading edges of the knives of the knife assemblies are serrated.

8. The clump reducer kit of claim 6 wherein the blades include serrated, angled, and sharpened cutting edges.

9. The clump reducer of claim 6 wherein each knife assembly of the plurality of knife assemblies are arranged along the beater member shaft in spaced apart, angularly offset relation to each of the other knife assemblies of the plurality of knife assemblies.

10. A method of breaking up clumps of compacted grain reaching a gated discharge opening in the floor of a grain storage bin during gravity flow of grain through the discharge opening comprising the steps of:
   (a) providing a beater member having a beater member shaft of a length sufficient to span a length dimension of the discharge opening, a plurality of radially projecting knifes affixed to the beater member shaft along a length dimension of the beater member shaft, and a first flange member affixed to a first end of the beater member shaft, wherein each of said knives of said plurality of radially projecting knifes has a leading edge and a tapered section;
   (b) providing a sweep auger having a central shaft with a second flange member on a first end of the central shaft;
   (c) coupling a second end of the beater member shaft to a rotational drive source for solely driving the beater member during gravity flow of loose grain with clumps of compacted grain to and through the discharge opening where the plurality of radially projecting knifes affixed to the beater member shaft are effective to reduce the size of any clumps engaged by the beater member;
   (d) providing a blade assembly having a plurality of sharpened, serrated blades affixed to and projecting normally from a base; and mounting the base on a gate that is slidable to selectively cover and uncover the gated discharge opening where the blades extend through the discharge opening for reducing any grain clumps that may not be engaged by the beater member and may partially block the gated discharge opening;
   (e) subsequently joining the first flange to the second flange after gravity flow of grain ceases to thereby drive both the beater member and the sweep auger for moving grain from the floor of the grain storage bin into the gated opening.

11. The method of claim 10 wherein the rotational drive source comprises a motor coupled in driving relation to a first end of a shaft of an unloading auger disposed beneath the floor of the grain storage bin and where a second end of the shaft of the unloading auger connects to an input shaft of a first right angle gear box.

12. The method of claim 11 and further including the step of providing a second right angle gear box having an input shaft coupled to the output shaft of the first right angle gear box and an output shaft coupled to the beater member shaft.

13. A clump reducer for use with a grain storage bin comprising:
   (a) a beater member shaft of a length corresponding to the size of a gated discharge opening formed through a floor surface of the storage bin;
   (b) a sweep auger comprising a sweep auger shaft and sweep auger flighting;
   (c) a plurality of knife assemblies affixed to the beater member shaft, each of said knife assemblies comprising a collar surrounding the beater member shaft and knives projecting radially from the collar, each of the knives comprising a leading edge and a tapered portion;
   (d) first and second bearing blocks affixed to a rotatable sweep frame, the first bearing block supporting a first end portion of the beater member shaft and the second bearing block supporting a first end of the sweep auger shaft, wherein said first bearing block is adapted to permit the beater member shaft to rotate in overlaying relation with respect to the gated discharge opening;
   (e) a gear box having an input shaft and an output shaft, the input shaft coupled to an electric motor and the output shaft coupled through a universal joint to said beater member shaft;
   (f) a first flange having a first aperture and joined to a first end of the beater member shaft, a second flange having a second aperture and attached to a first end of the sweep auger shaft, and at least one bolt adapted for insertion through said first aperture and said second aperture to detachably joining the beater member shaft in driving relation with the sweep auger shaft; and
   (g) a blade assembly attached to a movable gate member wherein blades on the blade assembly project upward into the gated discharge opening.

14. The clump reducer of claim 13 further comprising a spacer disk positioned between the first and second flanges, said spacer disk including a third aperture adapted to be aligned with the first aperture and the second aperture, said bolt adapted to extend through said first aperture, said second aperture and third aperture when the first aperture, second aperture and third aperture are aligned.

* * * * *